United States Patent
Sakai et al.

(10) Patent No.: US 9,961,263 B2
(45) Date of Patent: May 1, 2018

(54) IMAGING APPARATUS INCLUDING A CAMERA SHAKE CORRECTION FUNCTION FOR CORRECTING IMAGE BLUR

(71) Applicant: Panasonic Intellectual Property Management Co., Ltd., Osaka (JP)

(72) Inventors: Takenori Sakai, Osaka (JP); Masahiro Murakami, Kyoto (JP); Yuji Ueda, Osaka (JP); Takeyuki Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/263,599

(22) Filed: Sep. 13, 2016

(65) Prior Publication Data

US 2017/0094173 A1  Mar. 30, 2017

(30) Foreign Application Priority Data

Sep. 25, 2015  (JP) ................................. 2015-188820

(51) Int. Cl.
*H04N 5/232* (2006.01)
(52) U.S. Cl.
CPC ..... *H04N 5/23287* (2013.01); *H04N 5/23258* (2013.01)
(58) Field of Classification Search
CPC ................................................. H04N 5/23287
See application file for complete search history.

(56) References Cited

U.S. PATENT DOCUMENTS

| | | | | |
|---|---|---|---|---|
| 6,630,950 B1 * | 10/2003 | Ohkawara | .......... | H04N 5/23248 348/208.11 |
| 8,351,772 B2 * | 1/2013 | Wakamatsu | ............. | G03B 5/00 348/208.99 |
| 2003/0063904 A1 | 4/2003 | Mizumura | | |
| 2007/0212042 A1 | 9/2007 | Kosako et al. | | |

(Continued)

FOREIGN PATENT DOCUMENTS

| JP | 2003-107550 A | 4/2003 |
|---|---|---|
| JP | 2007-078957 A | 3/2007 |
| JP | 2007-240733 A | 9/2007 |

(Continued)

*Primary Examiner* — Gary C Vieaux
(74) *Attorney, Agent, or Firm* — Renner, Otto, Boisselle & Sklar, LLP

(57) ABSTRACT

An imaging apparatus is an imaging apparatus including a camera shake correction function for correcting image blur in a captured image. The imaging apparatus includes a shake detector for detecting shaking of the imaging apparatus, a correction lens for correcting the image blur in the captured image, a lens driver for moving the correction lens on a plane perpendicular to an optical axis, an operating unit for receiving an instruction from a user, and a controller for generating a drive signal for the lens driver based on an output of the shake detector. The controller changes the drive signal according to a setting regarding an amplitude of shaking that is a target of camera shake correction and a setting regarding a frequency of the shaking that is the target of camera shake correction. Also, the controller changes the setting regarding the amplitude and the setting regarding the frequency based on an instruction from the user.

10 Claims, 9 Drawing Sheets

(56) References Cited

U.S. PATENT DOCUMENTS

2011/0273572 A1* 11/2011 Tsuchida .................. G03B 5/00
                                                    348/208.4
2015/0103194 A1* 4/2015 Takeuchi ........... H04N 5/23287
                                                    348/208.6

FOREIGN PATENT DOCUMENTS

JP          2009-251492 A      10/2009
JP          2009244434 A   *   10/2009

* cited by examiner

| SETTING VALUE | AMPLITUDE RANGE | SUPPRESSION EFFECT | EXAMPLE USE CASE |
|---|---|---|---|
| 1 | SMALL | STRONG | FIXED SHOOTING (HOLDING GRIPS WITH BOTH HANDS) |
| 2 | ... | ... | FIXED SHOOTING (HOLDING HANDLE) |
| 3 | SMALL TO MEDIUM | MEDIUM | FIXED SHOOTING (LOW/HIGH ANGLE) (* DEFAULT SETTING) |
| 4 | ... | ... | SHOOTING WHILE ADJUSTING COMPOSITION |
| 5 | SMALL TO LARGE | WEAK | PANNING OF SCENERY |

| SETTING VALUE | FREQUENCY BAND | EXAMPLE USE CASE |
|---|---|---|
| 1 | LOW TO HIGH | FIXED SHOOTING (LOW/HIGH ANGLE) |
| 2 | MEDIUM TO HIGH | SHOOTING WHILE ADJUSTING COMPOSITION (* DEFAULT SETTING) |
| 3 | HIGH | PANNING OF SCENERY, TRACKING OF SUBJECT |

FREQUENCY OF CAMERA SHAKE (Hz)

IMAGING APPARATUS INCLUDING A CAMERA SHAKE CORRECTION FUNCTION FOR CORRECTING IMAGE BLUR

BACKGROUND

1. Technical Field

The present disclosure relates to an imaging apparatus provided with a camera shake correction function.

2. Description of the Related Art

An imaging apparatus on which detection means (for example, a gyro sensor) for detecting shaking of the imaging apparatus is mounted is known (for example, refer to PTL 1).

According to such an imaging apparatus, influence of shaking on a captured image is reduced by detecting vibration in a frequency range of about 1 Hz to 10 Hz caused by shaking of the hand of a photographer by the detection means, and by driving a correction lens in an interchangeable lens and/or an imaging device based on the detection result.

CITATION LIST

Patent Literature

PTL 1: Unexamined Japanese Patent Publication No. 2009-251492

In the case of shooting a moving image, depending on a scene, a photographer sometimes shoots a video while moving an imaging apparatus, but if a uniform camera shake correction is activated without taking the scene into consideration, a video intended by the photographer may not be shot.

SUMMARY

The present disclosure provides an imaging apparatus which allows shooting of a video according to the preference of a user while activating a camera shake correction function.

An imaging apparatus of the present disclosure is an imaging apparatus including a camera shake correction function for correcting image blur in a captured image. The imaging apparatus includes a shake detector for detecting shaking of the imaging apparatus, a correction lens for correcting the image blur in the captured image, a lens driver for moving the correction lens on a plane perpendicular to an optical axis, an operating unit for receiving an instruction from a user, and a controller for generating a drive signal for the lens driver based on an output of the shake detector. The controller changes the drive signal according to a setting regarding an amplitude of shaking that is a target of camera shake correction and a setting regarding a frequency of the shaking that is the target of camera shake correction. Also, the controller changes the setting regarding the amplitude of the shaking and the setting regarding the frequency of the shaking based on an instruction from the user.

According to the present disclosure, a user may freely perform setting regarding camera shake correction, and thus an imaging apparatus allowing a user to set optimal blur correction according to various scenes may be provided.

DETAILED DESCRIPTION

Hereinafter, exemplary embodiments of the present disclosure will be described with reference to the drawings as appropriate. However, in the detailed description, unnecessary description regarding a conventional technology and substantially the same elements may be omitted. This is to simplify the description. Also, the following description and the appended drawings are disclosed so as to help those skilled in the art sufficiently understand the present disclosure, and are not intended to limit the subject described in the claims. In the following, description will be given citing a video camera as an example of an imaging apparatus.

First Exemplary Embodiment

A video camera according to a first exemplary embodiment includes a camera shake correction function for reducing image blur in a captured image that is caused by shaking of the video camera. Also, the video camera according to the first exemplary embodiment includes a function for allowing a user to set effects (performance) of the camera shake correction function, and a user may set optimal camera shake correction according to various scenes.

[1-1. Configuration]

Figure 1:
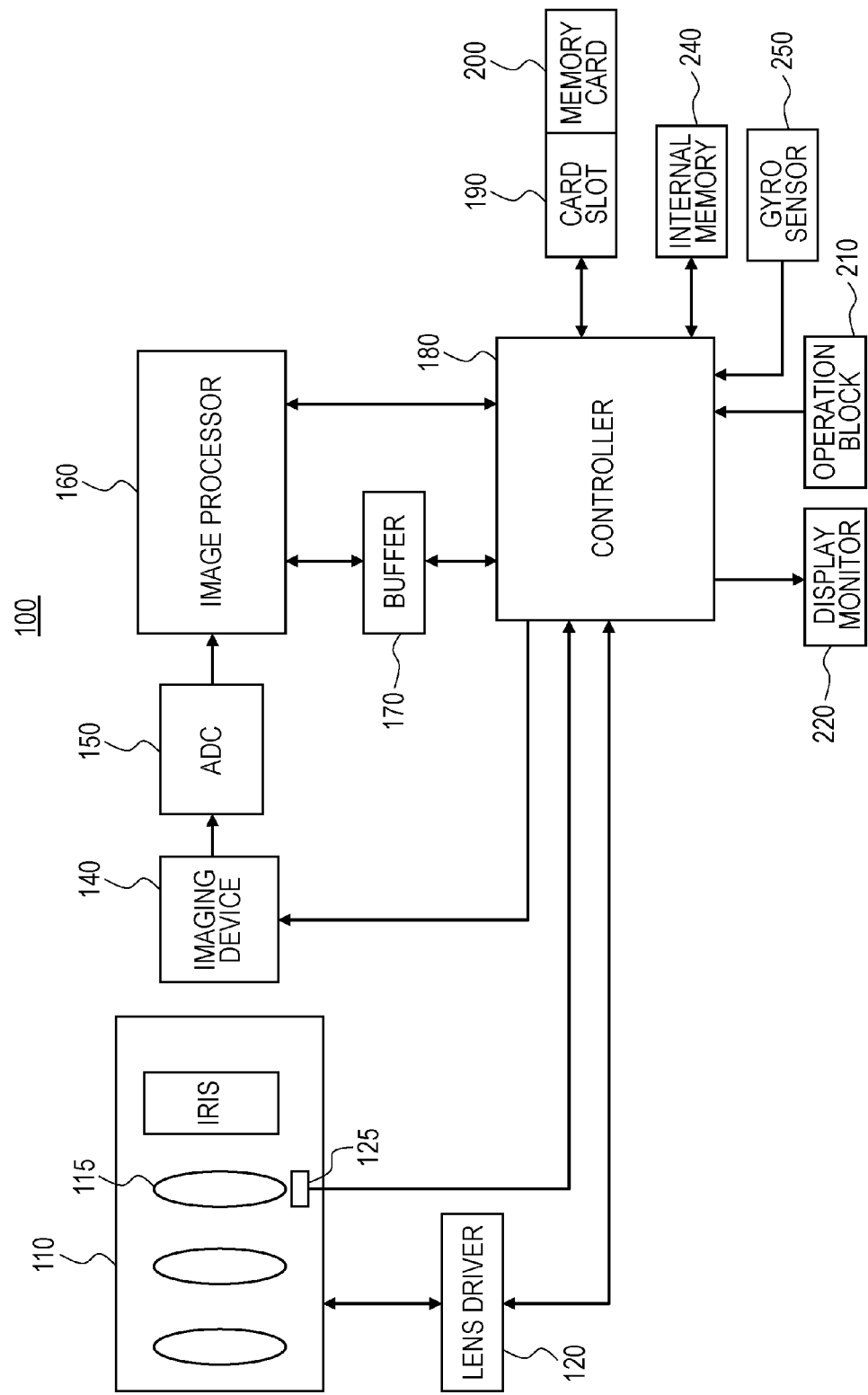
FIG. 1 is a block diagram showing a configuration of a video camera according to a first exemplary embodiment.

The video camera according to the first exemplary embodiment is a camera that is capable of capturing a subject and of recording moving image data or still image data. FIG. 1 is a block diagram showing a configuration of the video camera. Video camera 100 includes optical system 110, lens driver 120, and imaging device 140. Furthermore, video camera 100 includes AD converter 150, image processor 160, buffer 170, controller 180, operation block 210, and display monitor 220. Moreover, video camera 100 includes internal memory 240, card slot 190, and gyro sensor 250.

Optical system 110 includes, in addition to a zoom lens and a focus lens, correction lens (OIS (Optical Image Stabilizer) lens) 115. The zoom lens is a lens for changing the magnification of a subject image that is formed by the optical system. The focus lens is a lens for changing a focus state of the subject image that is formed on imaging device 140. The zoom lens and the focus lens are configured from one or a plurality of lenses.

Correction lens 115 is a lens for the camera shake correction function, and is for correcting blur of the subject image that is formed on imaging device 140. Correction lens 115 reduces blur of the subject image on imaging device 140 by moving in a direction of cancelling the shaking of video camera 100. Correction lens 115 is configured from one or a plurality of lenses.

Lens driver 120 includes an element for driving each of the focus lens and correction lens 115. Lens driver 120 includes a motor, and causes the focus lens to move along an optical axis of optical system 110 under the control of controller 180. The element of lens driver 120 for driving the focus lens may be realized by a DC motor, a stepping motor, a servo motor, an ultrasonic motor, or the like.

The element of lens driver 120 for driving correction lens 115 may be realized by a magnet and a planar coil, for example, but it is also possible to use other actuators such as an ultrasonic motor. To realize the camera shake correction function, lens driver 120 receives a drive signal from controller 180, and causes correction lens 115 to shift on a plane perpendicular to the optical axis of optical system 110. Additionally, in the present disclosure, the plane that is perpendicular to the optical axis of optical system 110 is not limited to a flat plane. A curved surface where the optical axis of optical system 110 is a normal line may also be cited as an example of a plane that is perpendicular to the optical axis of optical system 110.

Position sensor 125 is a sensor for detecting a position of correction lens 115 on a plane that is perpendicular to the optical axis of optical system 110. Position sensor 125 may be realized by a magnet and a Hall element, for example.

Imaging device 140 captures a subject image entering through optical system 110, and generates image data of a captured image. Imaging device 140 is a CMOS (Complementary Metal Oxide Semiconductor) image sensor, for example. The generated image data is digitalized by AD converter 150. The digitalized image data is subjected to a predetermined image processing by image processor 160. The predetermined image processing is a gamma correction process, a white balance correction process, a flaw correction process, an YC conversion process, an electronic zoom process, a JPEG compression process or the like, for example.

Imaging device 140 performs an operation of capturing a still image, an operation of capturing a through image, and the like. A through image is mainly a moving image, and is displayed on display monitor 220 for a user to decide a composition for capturing a still image.

Display monitor 220 displays various pieces of information. For example, display monitor 220 displays an image (a through image) indicated by image data which has been captured by imaging device 140 and subjected to image processing by image processor 160. Also, display monitor 220 displays a menu screen to be used by a user to perform various settings on video camera 100, for example. Display monitor 220 is configured by a liquid crystal display device or an organic EL device, for example.

Operation block 210 is a generic term for user interfaces that receive operations (instructions) from users. Operation block 210 includes a button, a lever, a dial, a touch panel, a switch and the like for receiving operations (instructions) from a user. Specifically, operation block 210 includes a release button, a zoom lever, a power supply button, a mode switching dial, a cursor key, a touch panel, and the like. Also, operation block 210 includes virtual buttons and icons displayed on display monitor 220.

Memory card 200 may be mounted in card slot 190, and card slot 190 accesses memory card 200 under the control of controller 180. Video camera 100 may record image data in memory card 200, or read image data recorded in memory card 200, for example.

Gyro sensor 250 (shake detector) detects shaking of video camera 100, and transmits a detection signal to controller 180.

Gyro sensor 250 detects shaking (vibration) in a yawing direction and a pitching direction based on a change in the angle per unit time, that is, an angular velocity, of video camera 100. Gyro sensor 250 transmits, as the detection signal, an angular velocity signal indicating the detected amount of shaking (angular velocity) to controller 180. In the first exemplary embodiment, a gyro sensor is used as angular velocity detection means, but other sensors may be used instead of the gyro sensor as long as shaking of video camera 100 may be detected.

Controller 180 controls operation of entire video camera 100. At the time of a control operation or an image processing operation, controller 180 uses internal memory 240 as a work memory. In relation to the camera shake correction function, controller 180 controls lens driver 120 based on an output of position sensor 125 and an output of gyro sensor 250.

Controller 180 includes a CPU or an MPU, and a predetermined function is realized by the CPU or the MPU executing a program (software).

[1-1-1. Configuration for Camera Shake Correction Function]

Figure 2:
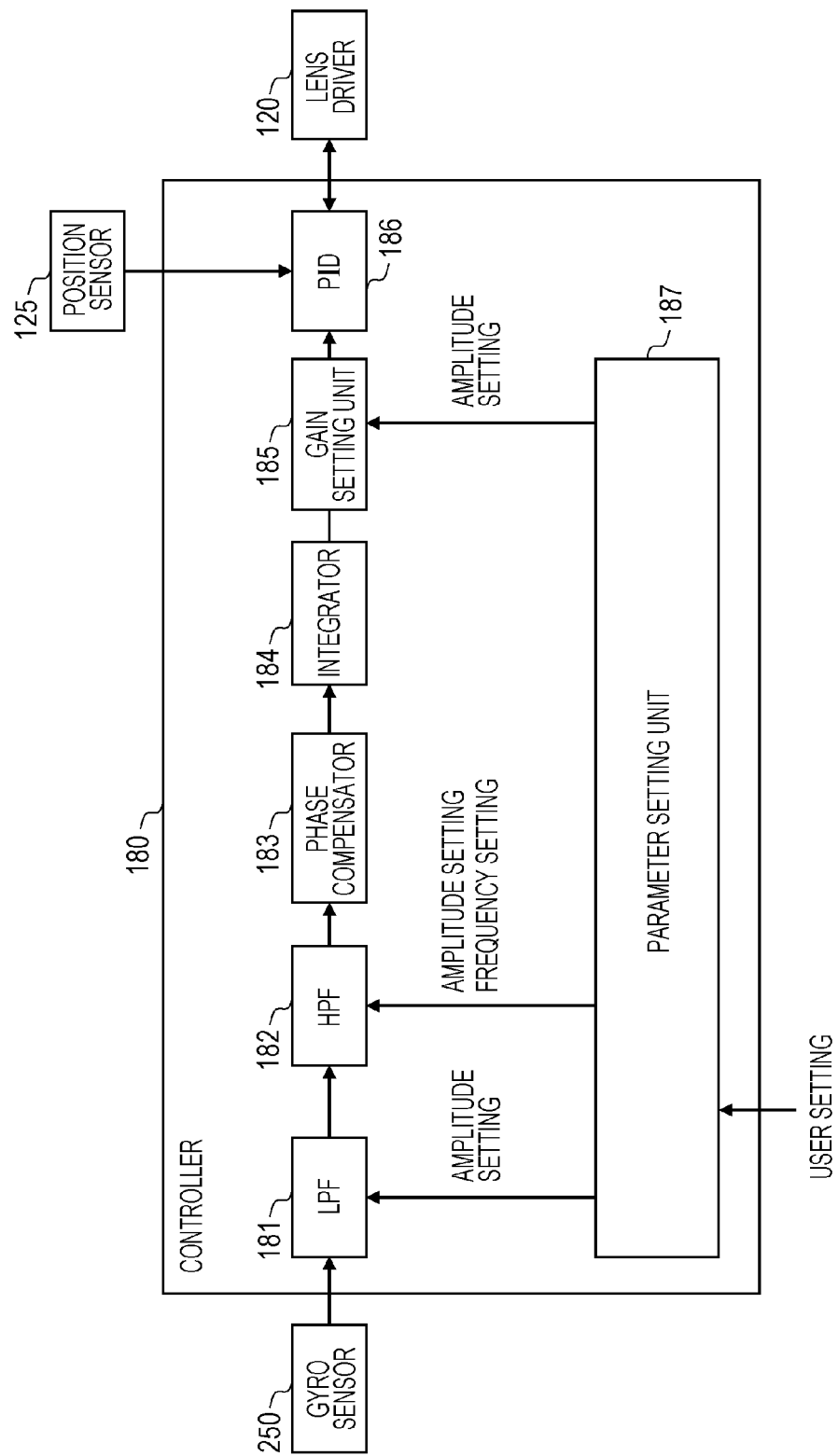
FIG. 2 is a block diagram showing a configuration of a controller, for a camera shake correction function, of the video camera according to the first exemplary embodiment.

FIG. 2 is a diagram showing main elements, of controller 180, for realizing the camera shake correction function. Controller 180 includes LPF (Low Pass Filter) 181, HPF (High Pass Filter) 182, phase compensator 183, integrator 184, gain setting unit 185, PID (Proportional Integral Differential) controller 186, and parameter setting unit 187. The function of each of these processors is realized by controller 180 executing a predetermined program.

LPF 181 has an A/D conversion function of converting the format of an angular velocity signal from gyro sensor 250 from analog to digital. Also, to eliminate noise and extract only the shaking of video camera 100, LPF 181 cuts off a high frequency component of the angular velocity signal whose format has been converted to digital. Normally (in a default setting), the cut-off frequency of LPF 181 is set taking into consideration that the frequency of shaking of the hand of a photographer is generally a low frequency of about 1 Hz to 10 Hz.

To cut off a drift component, HPF 182 cuts off a predetermined low-frequency component included in a signal received from LPF 181. Phase compensator 183 corrects a phase delay of a signal received from HPF 182.

Integrator 184 integrates a signal indicating the angular velocity of shaking (vibration) input from phase compensator 183, and generates a signal indicating the angle of the shaking (vibration). In the following, the signal generated by integrator 184 will be referred to as a "shake detection signal". The shake detection signal from integrator 184 is input to gain setting unit 185.

Gain setting unit 185 adjusts an amplitude of the shake detection signal generated by integrator 184 according to a lens position or the like. The shake detection signal adjusted by gain setting unit 185 is input to PID controller 186.

PID controller 186 performs PID control based on a difference between the input shake detection signal and position information of correction lens 115 received from position sensor 125, and generates a drive signal for camera shake correction. The drive signal is transmitted to lens driver 120. Lens driver 120 drives correction lens 115 based on the drive signal.

Parameter setting unit 187 adjusts parameters, such as cut-off frequencies or the like, of LPF 181 and HPF 182 based on settings regarding camera shake correction set by a user through operation block 210. An effect (performance) of the camera shake correction function is thereby changed based on the settings regarding camera shake correction.

[1-2. Blur Correction Process]

A blur correction process by video camera 100 configured in the above manner will be described.

Controller 180 receives a detection signal from gyro sensor 250, and generates a shake detection signal from the received detection signal. Controller 180 generates a drive signal for shifting correction lens 115, based on the shake detection signal and the position information from position sensor 125. Then, controller 180 changes the drive signal for shifting correction lens 115 according to settings of the camera shake correction function (settings of parameters), and outputs the signal to lens driver 120. Settings of the camera shake correction function will be described later. Lens driver 120 causes correction lens 115 to shift on a plane perpendicular to the optical axis, according to the drive signal from controller 180, so as to cancel the shaking detected by gyro sensor 250. A moving image may thereby be shot while eliminating the influence of shaking of video camera 100.

Additionally, in the above description, a drive signal is first generated based on the shake detection signal and the position information, and then, the drive signal is changed according to the settings of the camera shake correction function, but the drive signal may be changed according to the settings of the camera shake correction function at the time of being generated based on the shake detection signal and the position information.

As described above, video camera 100 of the first exemplary embodiment enables shooting of a moving image without blur by driving correction lens 115 based on shaking detected by gyro sensor 250 and cancelling the shaking of video camera 100.

[1-2-1. Setting of Camera Shake Correction Function]

Figure 3:
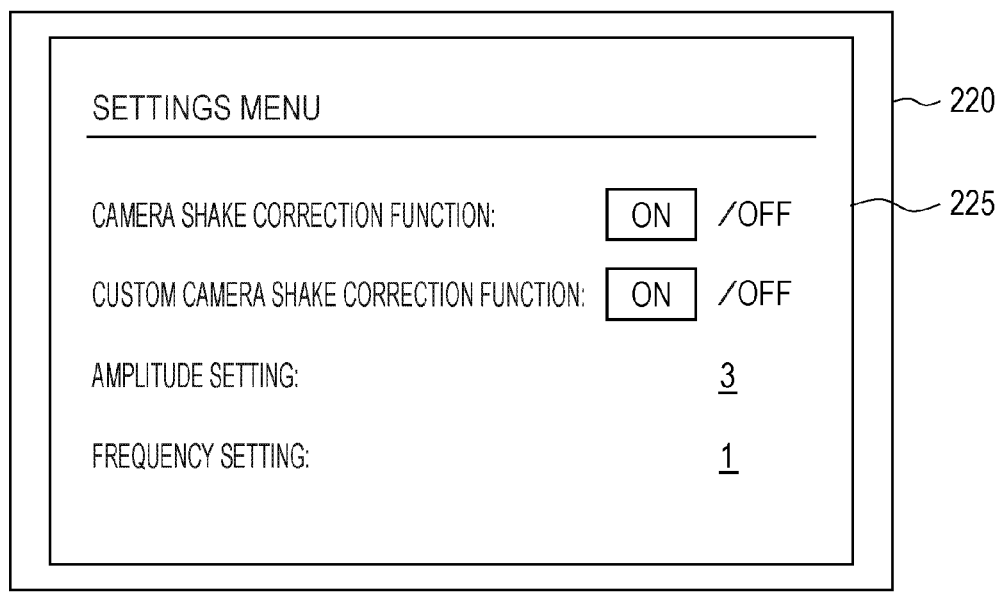
FIG. 3 is a diagram showing a menu screen regarding settings of a camera shake correction function.

According to video camera 100 of the first exemplary embodiment, a user may set ON (valid)/OFF (invalid) of the camera shake correction function. Moreover, video camera 100 includes a function for allowing a user to set an effect of camera shake correction. In the following, setting of an effect of camera shake correction by a user will be referred to as "custom setting", and camera shake correction that is performed according to the custom setting will be referred to as "custom camera shake correction". Also with respect to the function of custom camera shake correction, ON (valid)/OFF (invalid) may be set by a user. For example, video camera 100 displays menu screen 225 as shown in FIG. 3 on display monitor 220. A user sets ON/OFF of functions on menu screen 225 before shooting of an image, for example.

The camera shake correction function of video camera 100 is activated only when the camera shake correction function is set to ON (valid). In the case where the camera shake correction function is set to ON (valid), and the custom camera shake correction function is set to ON, custom camera shake correction operation is performed according to settings of camera shake correction set in advance by a user. On the other hand, in the case where the camera shake correction function is set to ON (valid), but the custom camera shake correction function is set to OFF, camera shake correction operation is performed according to the default setting.

[1-2-2. Custom Camera Shake Correction]

In the following, a setting parameter for custom camera shake correction will be described.

Effects of the camera shake correction function may be changed by using two types of parameters, "amplitude" and "frequency". The parameter of "amplitude" specifies the range of the size of shaking that activates the camera shake correction function. The parameter of "frequency" specifies the frequency band of shaking that activates the camera shake correction function. Video camera 100 is configured to allow a user to set and change the two parameters of "amplitude" and "frequency" with respect to custom camera shake correction. A user may set optimal camera shake correction at the time of shooting a moving image, according to various scenes, by appropriately setting the values of these parameters. Additionally, these parameters are set by a user on menu screen 225 shown in FIG. 3, for example.

Figures 4A, 4B:
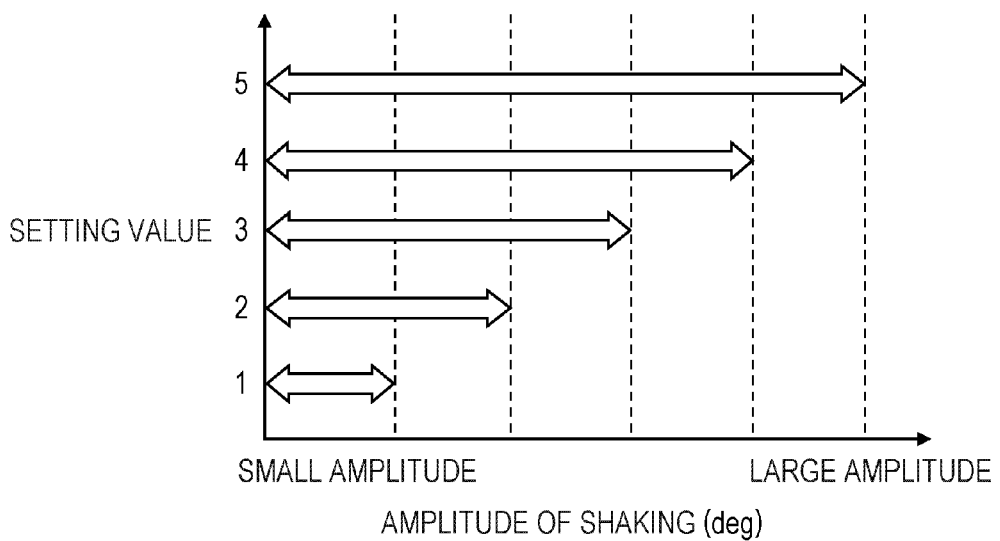
FIG. 4A is a diagram for describing amplitude settings of the camera shake correction function.
FIG. 4B is a diagram for describing the amplitude settings of the camera shake correction function.

FIGS. 4A and 4B are diagrams for describing settings for amplitude (hereinafter referred to as "amplitude settings") of the custom camera shake correction.

As shown in FIG. 4A, at video camera 100, the range of amplitude of shaking, which is the target of camera shake correction, may be set in five stages. FIG. 4B is a diagram for describing the range of amplitude of shaking covered by each setting. Setting "1" is a setting according to which the suppression effect on shaking is increased and the range of amplitude of shaking where the camera shake correction effect is the largest is the smallest, and a small amplitude region is set. Setting "5" is a setting according to which the suppression effect on shaking is reduced and the range of the amplitude of shaking where the camera shake correction effect is the largest is the largest, and a wide region from a small amplitude to a large amplitude is set. That is, as the setting value is increased (from "1" to "5"), the suppression effect on shaking that can be reduced by the camera shake correction function is reduced, and the maximum suppression range of the amplitude is increased such that the maximum value is increased.

Additionally, as described above, the capacity to suppress (reduce) shaking is increased as the amplitude of shaking that can be corrected is smaller. That is, there is a trade-off relationship between the amplitude of shaking and the capacity to suppress (reduce) shaking. For example, at setting "5", shaking of a large amplitude is corrected, but the suppression effect on minute amplitude is reduced.

Following use cases are conceivable for the respective settings, for example. Setting "1" is a setting that is suitable for a case where a subject is fixed, and shooting is performed in a state where a user is firmly holding grips of video camera 100 with both hands. In this case, shaking (vibration) of a large amplitude is not likely to occur, and thus, the target of correction is narrowed down to only shaking of a small amplitude, and thus, shaking of a small amplitude may be reliably suppressed. Setting "2" is a setting that is suitable for a case where a subject is fixed, and shooting is performed in a state where a user is holding a handle of video camera 100, for example. Setting "3" is a setting that is suitable for a case where a subject is fixed, and shooting is performed in a state where a user is holding the handle of video camera 100 at a low angle or a high angle, for example. Setting "4" is a setting that is suitable for a case where shooting is performed while adjusting a composition, for example. Setting "5" is a setting that is suitable for shooting scenery while moving (panning) video camera 100, for example. In the case of shooting a subject while moving (panning) video camera 100, shaking of a large amplitude possibly occurs, but large shaking may be corrected by setting "5".

Figures 5A, 5B:
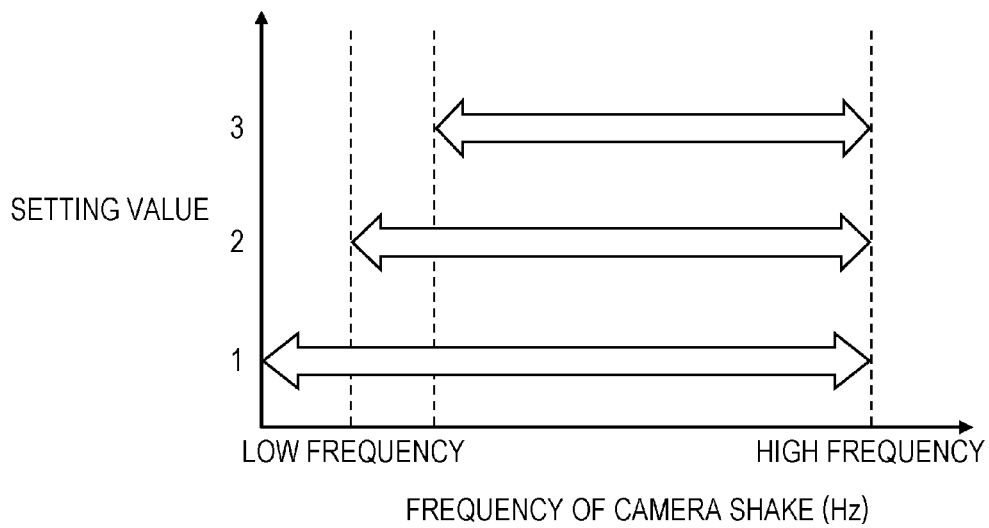
FIG. 5A is a diagram for describing frequency settings of the camera shake correction function.
FIG. 5B is a diagram for describing the frequency settings of the camera shake correction function.

FIGS. 5A and 5B are diagrams for describing settings for frequency band (hereinafter referred to as "frequency settings") with respect to custom setting for camera shake correction.

As shown in FIG. 5A, at video camera 100, the frequency band of shaking, which is the target of function of camera shake correction, may be set in three stages. FIG. 5B is a diagram for describing the frequency band of shaking covered by each setting. In each of settings "1" to "3", a high-frequency domain is made a target of camera shake correction, but the domain where camera shake correction is not performed is different for a low-frequency domain. That is, as the setting value is increased (from "1" to "3"), the range of the frequency domain on the low-band side which is not the target of camera shake correction is increased. In other words, a larger setting value means a reduced range of frequency domain of shaking which is the target of camera shake correction.

Following use cases are conceivable for the respective settings, for example. Setting "1" is a setting that is suitable for a case where shooting is to be performed with a fixed angle of view of a subject, for example. Setting "2" is a setting that is suitable for a case where shooting is performed while adjusting a composition, for example. Setting "3" is a setting that is suitable for shooting scenery while moving (panning) video camera 100, for example.

As described above, according to the custom camera shake correction, the amplitude setting may be performed in five stages, and the frequency setting may be performed in three stages, and thus, setting in a total of 15 stages is possible. A user is thereby allowed to set camera shake correction according to a scene, and the convenience of camera shake correction is increased. The setting values of the amplitude setting and the frequency setting for the custom camera shake correction are stored in internal memory 240.

Figure 6:
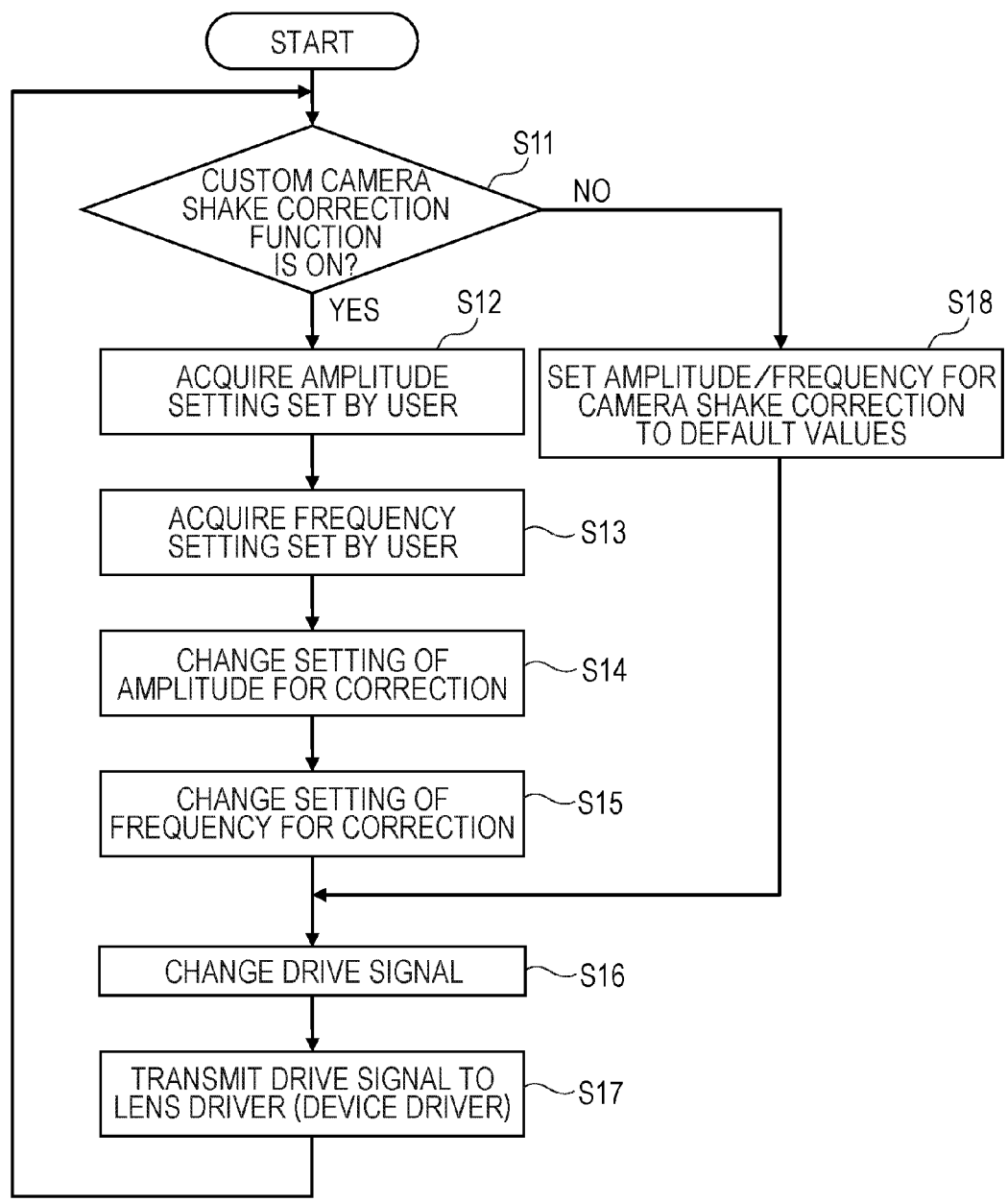
FIG. 6 is a flow chart showing a camera shake correction operation.

FIG. 6 is a flow chart showing a camera shake correction process. A camera shake correction process will be described with reference to the flow chart in FIG. 6. The present process is performed by controller 180. The present camera shake correction process is performed during shooting standby (during display of a through image) or during shooting of a moving image or a still image.

Controller 180 (parameter setting unit 187) first determines whether the custom camera shake correction function is ON or not (S11).

In the case where the custom camera shake correction function is ON (YES in S11), controller 180 reads, and acquires from internal memory 240, each of the values of the amplitude setting and the frequency setting of the custom settings set by the user in advance (S12, S13).

Then, controller 180 (parameter setting unit 187) changes the settings of the amplitude and the frequency of the camera shake correction function based on the acquired setting values (S14, S15). Specifically, with respect to the amplitude setting, parameters, such as a cut-off frequency, of LPF 181 and HPF 182 in controller 180, and the suppression effect of gain setting unit 185 are changed based on the acquired setting values by the user. With respect to the frequency setting, the parameter, such as a cut-off frequency, of HPF 182 is changed based on the acquired setting value by the user.

Additionally, in the example shown in FIG. 6, the value of the amplitude setting is acquired first (S12), and then, the value of the frequency setting is acquired (S13), but it is also possible to first acquire the value of the frequency setting (S13), and then, to acquire the value of the amplitude setting (S12).

Also, in the example shown in FIG. 6, the values of the amplitude setting and the frequency setting are acquired first (S12, S13), and then, the amplitude setting and the frequency setting are changed (S14, S15), but it is also possible to first acquire the value of the amplitude setting (S12) and change the amplitude setting (S14), and then, to acquire the value of the frequency setting (S13) and change the frequency setting (S15). Alternatively, the value of the frequency setting may be acquired first (S13) and the frequency setting may be changed (S15), and then, the value of the amplitude setting may be acquired (S12) and the amplitude setting may be changed (S14).

On the other hand, if the custom camera shake correction function is determined to be OFF in step S11, default values are set for the amplitude setting and the frequency setting (S18). In this case, the default value of the amplitude setting is the value of setting "3" shown in FIG. 3, and the default value of the frequency setting is the value of setting "2" shown in FIGS. 4A and 4B. These setting values are read from internal memory 240, and LPF 181, HPF 182, and gain setting unit 185 in controller 180 are set based on the setting values.

When settings are performed for the camera shake correction function in the above manner, controller 180 changes the drive signal for lens driver 120 based on a detection signal from gyro sensor 250 as described above (S16). Controller 180 transmits the changed drive signal to lens driver 120 (S17). The camera shake correction function is realized by lens driver 120 driving correction lens 115 according to the drive signal transmitted from controller 180.

The camera shake correction operation is performed as described above.

[1-2-3. Specific Example of Custom Camera Shake Correction]

Figure 7:
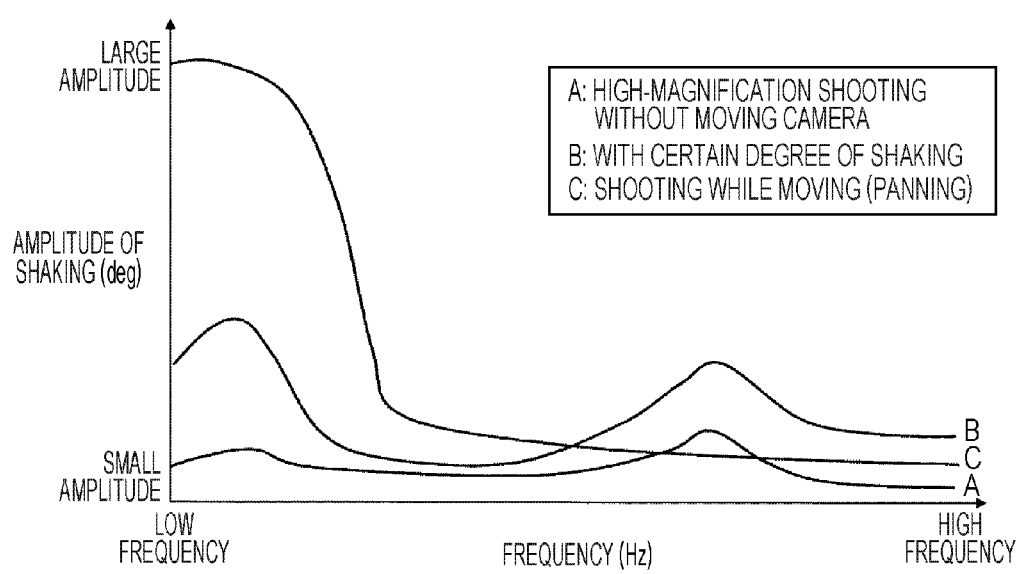
FIG. 7 is a diagram describing effects of the camera shake correction in various use cases (or settings of the camera shake correction)

In the following, specific effects of the custom camera shake correction will be described. FIG. 7 is a diagram describing effects of the custom camera shake correction for the following three cases A to C.

A) A case where camera shake is desired to be suppressed as much as possible at a time of shooting at a high magnification In this case, for example, setting is performed such that shaking at a fine amplitude and in a high-frequency band is mainly corrected (suppressed).

Figure 8A:
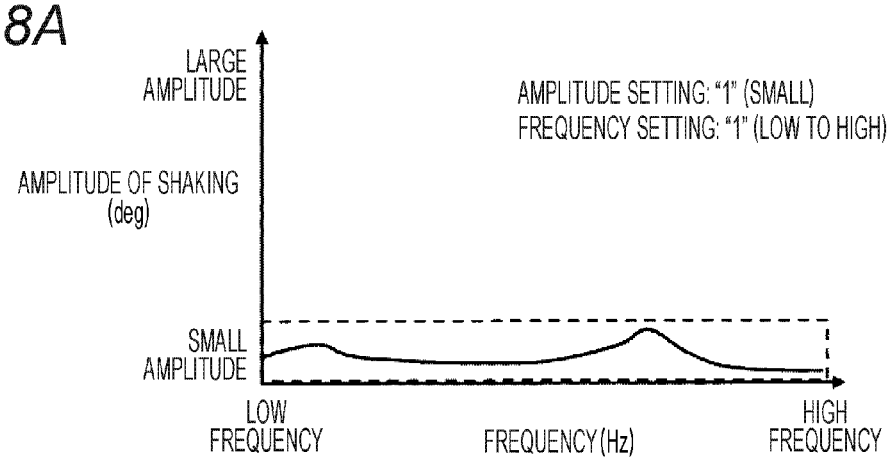
FIG. 8A is a diagram describing an effect of the camera shake correction where an amplitude setting is set to "1" (small) and a frequency setting is set to "1" (low to high) for the camera shake correction.

Accordingly, the amplitude setting is set to "1", and the frequency setting is set to "1". That is, as shown by a broken line in FIG. 8A, the correction target frequency band covers a wide range from a low frequency to a high frequency, and shaking at a small amplitude is made the target of camera shake correction.

B) A case where shooting is desired to be performed according to various scenes by adjusting a composition, etc.

Figure 8B:
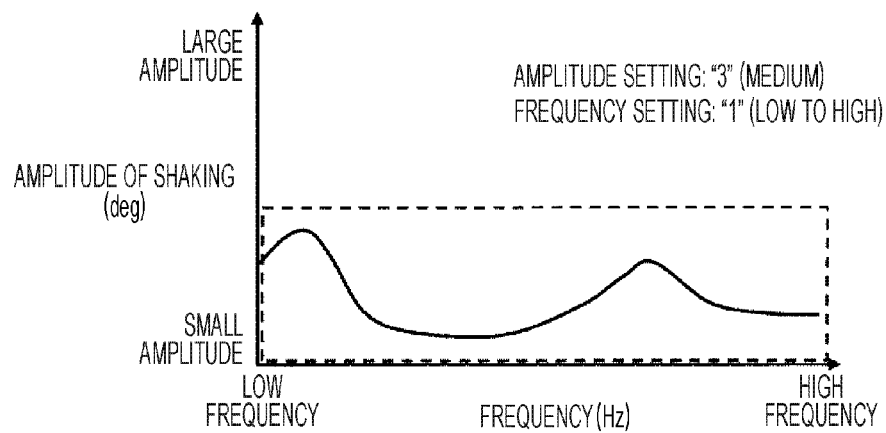
FIG. 8B is a diagram describing an effect of the camera shake correction where the amplitude setting is set to "3" (medium) and the frequency setting is set to "1" (low to high) for the camera shake correction.

In this case, setting is performed such that shaking is corrected in a generalized manner from small shaking to large shaking, for example, and that intentional operation (low frequency) correction is weakened. Accordingly, the amplitude setting is set to "3", and the frequency setting is set to "1". That is, as shown by a broken line in FIG. 8B, the correction target frequency band covers a wide range from a low frequency to a high frequency, and shaking at amplitudes at a low level to a medium level is made the target of camera shake correction.

Figure 8C:
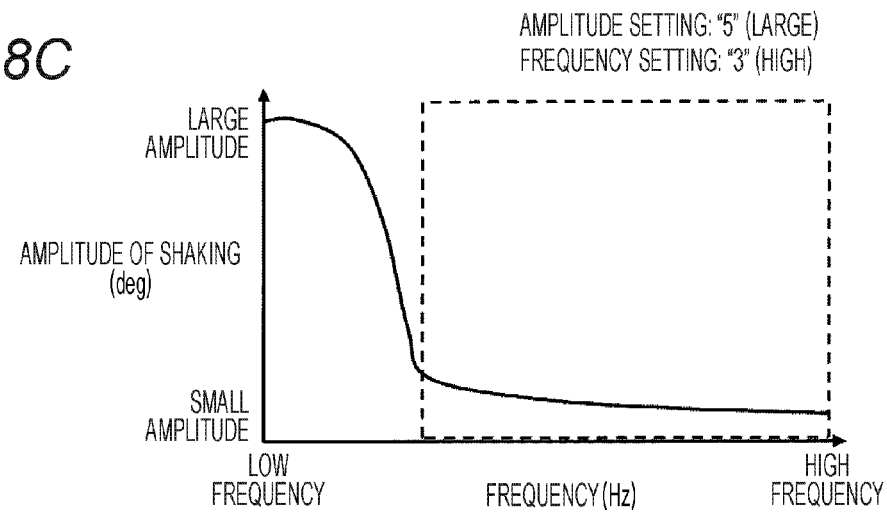
FIG. 8C is a diagram describing an effect of the camera shake correction where the amplitude setting is set to "5" (large) and the frequency setting is set to "3" (high) for the camera shake correction.

C) A case where a composition is desired to be swiftly decided after an operation such as panning In this case, setting is performed such that shaking from small shaking to large shaking is corrected, and that low-frequency shaking is not corrected. Accordingly, the amplitude setting is set to "5", and the frequency setting is set to "3". That is, as shown by a broken line in FIG. 8C, the correction target frequency band is a range excluding the low-frequency domain, and shaking in the low-frequency domain is not corrected (suppressed). The range of amplitude of the correction target shaking is a wide range including a large amplitude. This allows large shaking due to panning to be corrected.

As described above, by performing setting of the custom camera shake correction by combining amplitude setting and frequency setting, a user is allowed to achieve various camera shake correction effects.

[1-3. Effects, etc.]

Video camera 100 (an example of an imaging apparatus) of the first exemplary embodiment includes a camera shake correction function for correcting image blur in a captured image (for example, a moving image). Video camera 100 includes gyro sensor 250 (an example of a shake detector) for detecting shaking of video camera 100, correction lens 115 for correcting the image blur in the captured image, lens driver 120 for moving correction lens 115 on a plane perpendicular to an optical axis, operation block 210 for receiving an instruction from a user, and controller 180 (an example of a controller) for generating a drive signal for lens driver 120 based on an output of gyro sensor 250. Controller 180 changes the drive signal according to a setting (an amplitude setting) regarding an amplitude of shaking that is a target of camera shake correction and a setting (a frequency setting) regarding a frequency of the shaking that is the target of camera shake correction. Controller 180 changes the amplitude setting and the frequency setting based on an instruction from the user.

According to video camera 100 having the configuration described above, a user is allowed to freely set the performance of the camera shake correction function. Accordingly, a user may set optimal camera shake correction according to various scenes. The effect is particularly advantageous at the time of shooting a moving image when a video is often shot while moving the video camera according to the scene.

Second Exemplary Embodiment

Like video camera 100 of the first exemplary embodiment, a video camera of a second exemplary embodiment includes a camera shake correction function for reducing image blur in a captured image that is caused by shaking of the video camera. Moreover, the video camera of the second exemplary embodiment also includes a function for allowing a user to set the effect (performance) of the camera shake correction function, and a user is allowed to set optimal camera shake correction according to various scenes.

Figure 9:
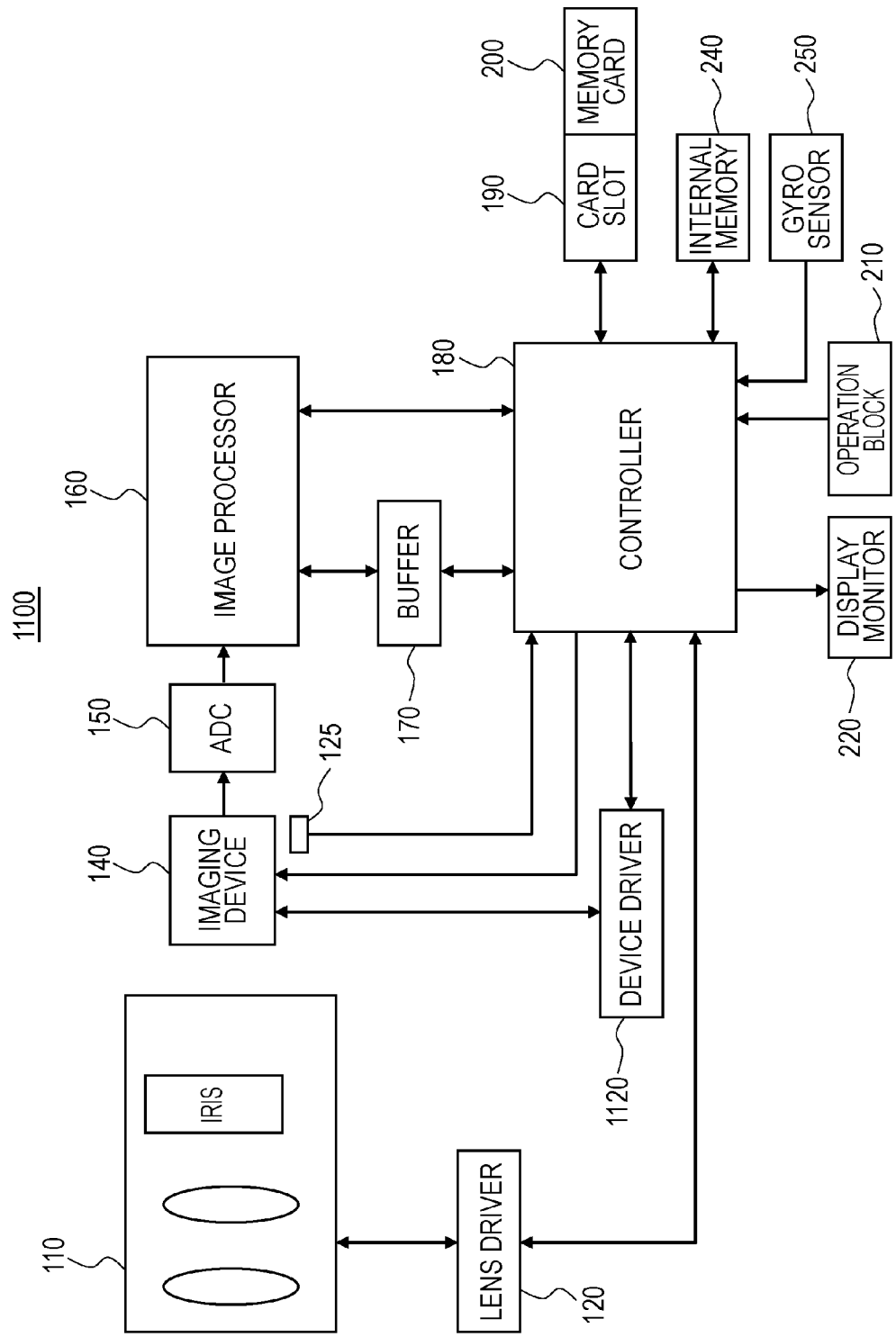
FIG. 9 is a block diagram showing a configuration of a video camera according to a second exemplary embodiment.

FIG. 9 is a block diagram showing a configuration of the video camera of the second exemplary embodiment. Video camera 1100 according to the second exemplary embodiment is different from video camera 100 according to the first exemplary embodiment, which corrects image blur by moving correction lens 115, in that image blur is corrected by moving imaging device 140. Other configurations are basically the same as those of video camera 100 of the first exemplary embodiment.

In the following, only the difference mentioned above will be described in detail, and a description on other configurations will be simplified or omitted. Additionally, in the case where the same member as that of video camera 100 of the first exemplary embodiment is used, the same reference sign as in the case of video camera 100 of the first exemplary embodiment will be used.

[2-1. Configuration]

As shown in FIG. 9, video camera 1100 of the second exemplary embodiment includes optical system 110, lens driver 120, and imaging device 140. Furthermore, video camera 1100 includes AD converter 150, image processor 160, buffer 170, controller 180, operation block 210, and display monitor 220. Still further, video camera 1100 includes internal memory 240, card slot 190, and gyro sensor 250.

According to video camera 1100 of the second exemplary embodiment, position sensor 125 detects the position of imaging device 140 on a plane that is perpendicular to the optical axis of optical system 110, instead of detecting the position of correction lens 115 on the plane that is perpendicular to the optical axis of optical system 110.

Also, video camera 1100 of the second exemplary embodiment includes device driver 1120 for correcting, in the camera shake correction function, blur in a subject image formed on imaging device 140. Controller 180 controls device driver 1120 based on an output of position sensor 125 and an output of gyro sensor 250 in relation to the camera shake correction function. To realize the camera shake correction function, device driver 1120 receives a drive signal from controller 180, and shifts imaging device 140 on the plane perpendicular to the optical axis of optical system 110.

Device driver 1120 includes an element for driving imaging device 140, and reduces blur in a subject image on imaging device 140 by moving imaging device 140 in a direction of offsetting the shaking of video camera 1100. The element for driving imaging device 140 may be realized by a magnet and a planar coil, for example, but it is also possible to use other actuators such as an ultrasonic motor.

[2-1-1. Configuration for Camera Shake Correction Function]

Like controller 180 of the first exemplary embodiment, controller 180 includes LPF 181, HPF 182, phase compensator 183, integrator 184, gain setting unit 185, PID controller 186, and parameter setting unit 187. PID controller 186 performs PID control based on a difference between an input shake detection signal and position information of imaging device 140 received from position sensor 125, and generates a drive signal for camera shake correction. The drive signal is transmitted to device driver 1120. Device driver 1120 drives imaging device 140 based on the drive signal.

[2-2. Blur Correction Process]

A blur correction process by video camera 1100 configured in the above manner will be described.

Controller 180 receives a detection signal from gyro sensor 250, and generates a shake detection signal from the received detection signal. Controller 180 generates a drive signal for shifting imaging device 140, based on the shake detection signal and the position information from position sensor 125. Then, controller 180 changes the drive signal for shifting imaging device 140 according to setting of the camera shake correction function (settings of parameters), and outputs the signal to device driver 1120. Device driver 1120 causes imaging device 140 to shift on a plane perpendicular to the optical axis according to the drive signal from controller 180, so as to cancel the shaking detected by gyro sensor 250. A moving image may thereby be shot while eliminating the influence of shaking of video camera 1100.

As described above, video camera 1100 of the second exemplary embodiment enables shooting of a moving image without blur by driving imaging device 140 based on shaking detected by gyro sensor 250 and cancelling the shaking of video camera 1100.

[2-2-1. Setting of Camera Shake Correction Function]

Like video camera 100 of the first exemplary embodiment, video camera 1100 of the second exemplary embodiment allows a user to set ON (valid)/OFF (invalid) of the camera shake correction function. Moreover, video camera 1100 includes a function for allowing a user to set an effect of camera shake correction.

[2-2-2. Custom Camera Shake Correction]

The camera shake correction process is performed by controller 180 during shooting standby (during display of a through image) or during shooting of a moving image or a still image. The camera shake correction process will be described with reference to the flow chart in FIG. 6.

As shown in FIG. 6, in the case where the custom camera shake correction function is ON (YES in S11), controller 180 reads, and acquires from internal memory 240, each of values of the amplitude setting and the frequency setting of the custom settings set by a user in advance (S12, S13), and then, changes the settings of the amplitude and the frequency of the camera shake correction function based on the acquired setting values (S14, S15). When settings are performed for the camera shake correction function in the above manner, controller 180 changes the drive signal based on a detection signal from gyro sensor 250 as described above (S16). Controller 180 transmits the changed drive signal to device driver 1120, not lens driver 120 (S17). The camera shake correction function is realized by device driver 1120 driving imaging device 140 according to the drive signal transmitted from controller 180.

[2-3. Effects, etc.]

Video camera 1100 (an example of an imaging apparatus) of the second exemplary embodiment includes a camera shake correction function for correcting image blur in a captured image (for example, a moving image). Video camera 1100 includes gyro sensor 250 (an example of a shake detector) for detecting shaking of video camera 1100, imaging device 140 for capturing a subject image, and generating image data of the captured image, device driver 1120 for moving imaging device 140 on a plane perpendicular to an optical axis, operation block 210 for receiving an instruction from a user, and controller 180 (an example of a controller) for generating a drive signal for device driver 1120 based on an output of gyro sensor 250. Controller 180 changes the drive signal according to a setting (an amplitude setting) regarding an amplitude of shaking that is a target of camera shake correction and a setting (a frequency setting) regarding a frequency of the shaking that is the target of camera shake correction. Controller 180 changes the amplitude setting and the frequency setting based on an instruction from the user.

According to video camera 1100 having the configuration described above, a user is allowed to freely set the performance of the camera shake correction function. Accordingly, a user may set optimal camera shake correction according to various scenes. The effect is particularly advantageous at the time of shooting a moving image when a video is often shot while moving the video camera according to the scene.

Other Exemplary Embodiments

The ideas of the exemplary embodiments are not limited to the exemplary embodiments described above. Various exemplary embodiments are conceivable. In the following, other exemplary embodiments to which the ideas of the exemplary embodiments above may be applied will be described.

The exemplary embodiments described above illustrate settings shown in FIGS. 4A, 4B and 5 with respect to the amplitude setting and the frequency setting for the camera shake correction. Specific contents (the number of stages, ranges) of the amplitude setting and the frequency setting are not limited to the contents shown in FIGS. 4A, 4B and 5. The amplitude setting and the frequency setting may be set as appropriate according to the use environment, conditions of use and the like of the video camera (the imaging apparatus).

In the first exemplary embodiment, the camera shake correction function is performed only by optical correction of shifting correction lens 115, and in the second exemplary embodiment, the camera shake correction function is performed by shifting the imaging device, but the methods for realizing the camera shake correction function are not limited to the above. For example, the camera shake correction function may be realized by shifting a trimming position of an image captured by imaging device 140 according to the blur. Also, the camera shake correction function may be realized by combining the optical camera shake correction of driving the correction lens and the camera shake correction on the side of imaging device 140.

In the exemplary embodiments described above, controller 180 is described to be configured by a CPU or an MPU for realizing a predetermined function in cooperation with software. Controller 180 may alternatively be a dedicated electronic circuit designed to realize a predetermined function. That is, controller 180 may be realized by various semiconductor integrated circuits, such as a CPU, an MPU, a microcomputer, a DSP, an FPGA, and an ASIC.

In the exemplary embodiments described above, a CMOS image sensor is cited as an example of the imaging device, but other types of image sensors may also be used. For example, a CCD (Charge Coupled Device) image sensor or an NMOS (Negative channel Metal Oxide Semiconductor) image sensor may be used as the imaging device.

In the exemplary embodiments described above, a description is given citing a video camera as an example of the imaging apparatus, but the imaging apparatus of the present disclosure is not limited to the video camera. The imaging apparatus may be any electronic device capable of shooting an image and including the camera shake correction function. For example, the imaging apparatus may be a digital camera, a camcorder, a cellular phone, a smartphone or the like.

Heretofore, the exemplary embodiments have been described as examples of the technology of the present disclosure. The detailed description and the appended drawings are disclosed for this purpose. Accordingly, structural elements described in the detailed description and shown in the appended drawings may include structural elements that are not essential for solving the problem. Hence, that these non-essential structural elements are described in the detailed description and shown in the appended drawings does not cause these structural elements to be immediately recognized as being essential.

The exemplary embodiments described above are for illustrating the technology of the present disclosure. Accordingly, various modifications, substitutions, additions, and/or omissions may be performed regarding the aforementioned exemplary embodiments within a range of claims and equivalents to the claims.

The present disclosure is useful for an electronic device capable of shooting an image and including the camera shake correction function. The present disclosure is applicable to an imaging apparatus, such as a digital camera or a camcorder, a cellular phone, a smartphone, and the like.

What is claimed is:

1. An imaging apparatus including a camera shake correction function for correcting image blur in a captured image, the imaging apparatus comprising:
   a shake detector for detecting shaking of the imaging apparatus;
   a correction lens for correcting the image blur in the captured image;
   a lens driver for moving the correction lens on a plane perpendicular to an optical axis;
   a controller for receiving an instruction from a user and for generating a drive signal for the lens driver based on an output of the shake detector,
   wherein
      the controller changes the drive signal according to a first setting specifying a range of an amplitude of shaking that is a target of camera shake correction and a second setting specifying a range of a frequency of the shaking that is the target of camera shake correction, the first setting and the second setting being set independently, and
      the controller accepts changes of the first setting and the second setting by the user.

2. The imaging apparatus according to claim 1, wherein the first setting is selected from conditions each of which has the range of the amplitude of the shaking that is target of camera shake correction, each range differing in a stage-by-stage manner.

3. The imaging apparatus according to claim 2, the conditions include a first condition and a second condition, wherein
   the first condition specifies the range of the amplitude as a first range, and
   the second condition specifies the range of the amplitude as a second range that includes the first range and is broader than the first range.

4. The imaging apparatus according to claim 3, wherein the second range includes the range in which the amplitude is larger than the first range.

5. The imaging apparatus according to claim 1, wherein the second setting is selected from conditions each of which has the ranger of the frequency of the shaking that is the target of camera shake correction, each range differing in a stage-by-stage manner.

6. The imaging apparatus according to claim 5, the conditions include a third condition and a fourth condition, wherein
   the third condition specifies the range of the frequency as a third range, and
   the fourth condition specifies the range of the frequency as a fourth range that includes the third range and is broader than the third range.

7. The imaging apparatus according to claim 6, wherein the fourth range includes the range in which the frequency is lower than the third range.

8. The imaging apparatus according to claim 1, wherein the captured image is a moving image.

9. The imaging apparatus according to claim 1, wherein:
   the first setting is selected from at least a first condition and a second condition,
   the second setting is selected from at least a third condition and a fourth condition,
   the first condition specifies the range of the amplitude as a first range,
   the second condition specifies the range of the amplitude as a second range that is broader than the first range,
   the third condition specifies the range of the frequency as a third range, and
   the fourth condition specifies the range of the frequency as a fourth range that is broader than the third range.

10. An imaging apparatus including a camera shake correction function for correcting image blur in a captured image, the imaging apparatus comprising:
   a shake detector for detecting shaking of the imaging apparatus;
   an imaging device for capturing a subject image, and generating image data of the captured image;
   a device driver for moving the imaging device on a plane perpendicular to an optical axis;
   a controller for receiving an instruction from a user and for generating a drive signal for the device driver based on an output of the shake detector,
   wherein
      the controller changes the drive signal according to a first setting specifying a range of an amplitude of shaking that is a target of camera shake correction and a second setting specifying a range of a frequency of the shaking that is the target of camera shake correction, the first setting and the second setting being set independently, and
      the controller accepts changes of the first setting and the second setting by the user.

* * * * *